United States Patent [19]

Izawa et al.

[11] Patent Number: 5,296,941
[45] Date of Patent: Mar. 22, 1994

[54] GRADATION COMPENSATION APPARATUS OF VIDEO IMAGE

[75] Inventors: Yosuke Izawa, Ibaraki; Naoji Okumura, Mino, both of Japan

[73] Assignee: Matsushita Electric Industrial Co, Ltd., Kadoma, Japan

[21] Appl. No.: 992,646

[22] Filed: Dec. 18, 1992

[30] Foreign Application Priority Data

Dec. 20, 1991 [JP] Japan ............................. 3-338088

[51] Int. Cl.⁵ .......................................... H04N 1/40
[52] U.S. Cl. .................................. 358/458; 358/455; 358/447; 358/443; 358/479; 382/51; 348/571
[58] Field of Search ............... 358/458, 455, 447, 448, 358/443, 522, 521, 160, 166; 382/51

[56] References Cited

U.S. PATENT DOCUMENTS

| | | | |
|---|---|---|---|
| 4,731,671 | 3/1988 | Alkofer | 358/455 |
| 5,068,718 | 11/1991 | Iwabe et al. | 358/164 |
| 5,241,386 | 8/1993 | Tsuji | 358/458 |

FOREIGN PATENT DOCUMENTS

| | | |
|---|---|---|
| 488542 | 6/1992 | European Pat. Off. . |
| 55-140372 | 11/1980 | Japan . |
| 3-51889 | 3/1991 | Japan . |
| 3-126377 | 5/1991 | Japan . |
| 4-183177 | 6/1992 | Japan . |

OTHER PUBLICATIONS

Patent Abstracts of Japan vol. 15, No. 334(E-1104) Aug. 1991 JP-A-3-126377.
A. Canas, "Interactive contrast enhancement using an electronic hardware system", Journal of Physics E. Scient. Instruments, Jun. 1984, pp. 533-538.

Primary Examiner—Edward L. Coles, Sr.
Assistant Examiner—Fan Lee
Attorney, Agent, or Firm—Cushman, Darby & Cushman

[57] ABSTRACT

A level of an input luminance signal for a pixel is compared with step values which change stepwise in level in a predetermined range of level, and distribution of the levels of the input luminance signal in the predetermined range of level is represented by a cumulative histogram. Subsequently, a histogram value is derived from the outline of the cumulative histogram, and a compensation value is produced on the basis of the histogram value, and the compensation value is added to the input luminance signal, and hence a compensated luminance signal is output to control the luminance of a video image.

3 Claims, 5 Drawing Sheets

GRADATION COMPENSATION APPARATUS OF VIDEO IMAGE

FIELD OF THE INVENTION AND RELATED ART STATEMENT

1. Field of the Invention

The present invention relates to a gradation compensation apparatus for compensating a gradation of a video image by changing luminance distribution.

2. Description of the Related Art

A distinct and vivid image is required to realize a high quality image for use in a large-sized display in a color television receiver. In order to realize the distinct and vivid image, a circuit for compensating gradation responding to luminance distribution in the video image have been developed. In general, in the gradation compensation circuit, non-linear operation is applied to a luminance signal of the video signal, so that the luminance distribution is changed in the video display.

A gradation compensation apparatus in the prior art is disclosed in the Japanese published unexamined patent application Hei 3-126377, for example. In the prior art, a relation between levels of the luminance signal and the number of occurrence of the levels in a predetermined time length is represented by a histogram within a predetermined range of level of the luminance signal. The data of the histogram is stored in a histogram memory, and luminance distribution on the video display is known by the data of the histogram.

In the generation of the histogram data, the number of occurrence of levels in the luminance signal which are higher than a predetermined level is fixed to a certain constant value by a limiter circuit, and the number of occurrence of levels which are lower than a predetermined level is set to zero by a clip circuit. Subsequently, after addition or subtraction of a predetermined constant to or from the histogram data, cumulative addition of the histogram data is performed in the histogram cumulative addition circuit, and a cumulative histogram is obtained. A luminance level of beginning the cumulative addition and a luminance level of closing the cumulative addition in the histogram cumulative addition circuit are set in a cumulation control register circuit, and thereby a range for performing the cumulative addition of the histogram data is controlled.

The data of the cumulative histogram is normalized by a normalization control register circuit, and the maximum data of the cumulative histogram is adjusted to an adequate value. Finally, non-linear operation is applied to an input luminance signal of the video signal on the basis of the data of the adjusted cumulative histogram. Thereby an output luminance signal which is applied to the video display is obtained to compensate the gradation of image.

OBJECT AND SUMMARY OF THE INVENTION

An object of the present invention is to provide a gradation compensation apparatus which changes a luminance distribution of a video image.

The gradation compensation apparatus of the video image in accordance with the present invention comprises:

step value generation means for generating a predetermined number of step value signals which change stepwise in level in the range of a first level and a second level during a predetermined time length, first comparator means for outputting a first value when the level of the step value signal is lower than the level of an input luminance signal, and outputting a second value signal when the level of the step value signal is higher than the level of the input luminance signal, by comparing the input luminance signal with the step value signals, cumulation means comprising a predetermined number of accumulators corresponding to the respective levels of the predetermined number of step value signals, for cumulating the second value output from the comparator means in the accumulators corresponding to the respective levels of the step value signals, normalization means for outputting a normalized value by multiplying the cumulated values cumulated by the cumulation means utilizing a first coefficient, an adjustment circuit for subtracting a predetermined reference histogram value being proportional to the level of the input luminance signal from the normalized value, reference value generation means for generating a reference value which is equal to the second predetermined level of the step value generation means, second comparator means for outputting the signal of a third value when the input luminance signal is equal to the reference value or below, and outputting the signal of a fourth value when the input luminance signal is higher than the reference value, by comparing the input luminance signal with the reference value, gate means for outputting the signal of the normalized value of the adjustment circuit when the second comparator means outputs the third value, and outputting the signal of 0 when the second comparator means outputs the fourth value, by inputting the normalized value output from the adjustment circuit and the output of the second comparator means, multiplier means for multiplying the output of the gate means basing on a predetermined second coefficient, and addition means for adding the input luminance signal to the output of the multiplier means.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Figure 1:
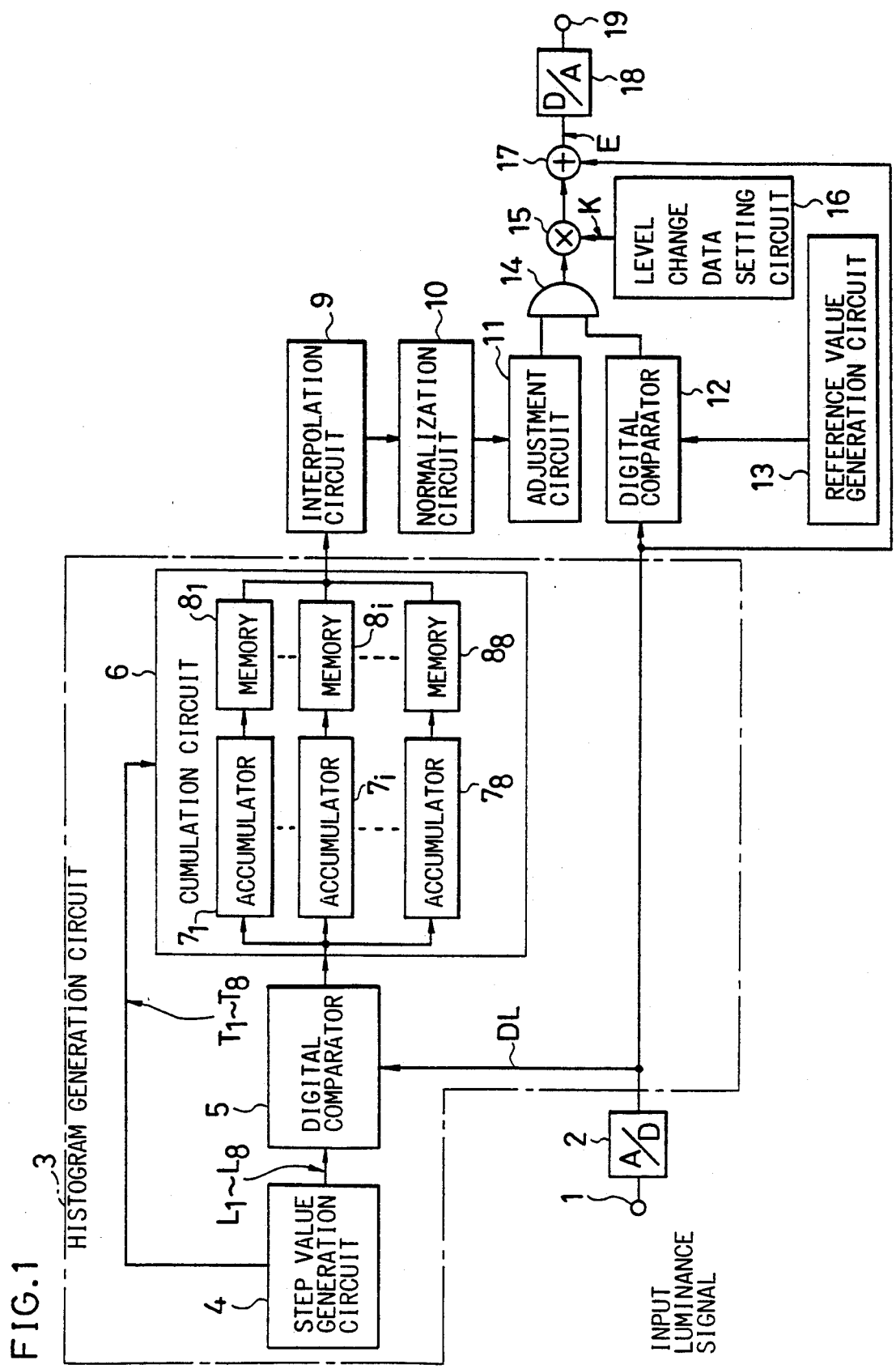
FIG. 1 is a block diagram of an embodiment of a gradation compensation apparatus in accordance with the present invention.

FIG. 1 is a block diagram of an embodiment of a gradation compensation apparatus in accordance with the present invention. Referring to FIG. 1, an analog luminance signal in a video signal of a video apparatus such as a television receiver is applied to a terminal 1 of an A/D converter 2 and is converted to a digital input luminance signal DL. The A/D converter 2 is a 8-bits system for example, and the analog luminance signal in a predetermined range of level is converted to digital values from 0 to 256. The input luminance signal DL is applied to a first digital comparator 5 in a histogram generation circuit 3. The variation range of the input luminance signal DL in the video apparatus is represented by levels 0, —, 256.

In general, in actual situation of use of the video apparatus, the variation range of level in the input luminance signal DL is in the range of level 0, —, level 128, and the level of the input luminance signal DL hardly exceeds the level 128. Therefore, even if the range of the level in the input luminance signal DL is limited between the level 0 and the level 128, an image quality in actual use is not influenced thereby. In the embodiment, the input luminance signal DL which exceeds the level 128 is not operated in the gradation compensation apparatus.

In the histogram generation circuit 3, a step value generation circuit 4 generates digital outputs which increase stepwise from the level 0 to a predetermined level every a predetermined period. A set of the output levels of the step value generation circuit 4 in the 8-bits system is shown as follows:

$16(L_1)$, $32(L_2)$, $48(L_3)$, $64(L_4)$, $80(L_5)$, $96(L_6)$, $112(L_7)$ and $128(L_8)$.

Reference characters $L_1$, —, $L_8$ put in parenthesis designate voltages of the output levels.

In the above-mentioned example, the output levels are 8 steps. The unit of the output level is "millivolt", for example. In the set mentioned above, eight outputs of the levels of an arithmetic progression of 16 are output, and the voltages $L_1$, —, $L_8$ increase stepwise from 16 millivolt (voltage $L_1$) to 128 millivolt (voltage $L_8$). After the output level reaches the voltage $L_8$ (128 millivolt), the output level returns to the voltage $L_1$ (16 millivolt). The above-mentioned operation is repeated with a predetermined period. The period of change from the voltage $L_1$ to the voltage $L_8$ is equal to the time length of the input luminance signal of one pixel. The time length of one pixel is inversely proportional to the number of division which divides the time length of one vertical scanning period (one field for example), and is set to a predetermined value.

The voltages $L_1$, —, $L_8$ output from the step value generation circuit 4 is applied to the first digital comparator 5 and is compared with the level of the input luminance signal DL.

In the digital comparator 5, level of the luminance signal DL is compared with the voltages $L_1$, —, $L_i$, —, $L_8$ in every pixel.

When the voltage $L_i$ is lower than the level of the luminance signal DL, the output of the digital comparator 5 is "0". On the other hand, when the voltage $L_i$ is equal to the level of the luminance signal DL or more, the output of the digital comparator 5 is "1". The above-mentioned relations are shown as follows:

Level of luminance signal DL > Voltage $L_1$ → the output is "0"     (1),

Level of luminance signal DL ≤ Voltage $L_1$ → the output is "1"     (2).

The output of the digital comparator 5 is applied to a cumulation circuit 6. The cumulation circuit 6 comprises eight accumulators $7_1$, $7_2$, $7_3$, $7_4$, $7_5$, $7_6$, $7_7$ and $7_8$ and also eight memories $8_1$, $8_2$, $8_3$, $8_4$, $8_5$, $8_6$, $8_7$ and $8_8$ corresponding to the respective accumulators $7_1$, —, $7_8$. And the cumulation circuit 6 performs cumulative operation in synchronism with the operation of the step value generation circuit 4.

The operation of the cumulation circuit 6 is elucidated hereafter. In the step value generation circuit 4, trigger signals $T_1$, —, $T_i$, — and $T_8$ are generated in synchronism with the generation of the voltages $L_1$, —, $L_i$, — and $L_8$, respectively and are applied to the cumulation circuit 6. The accumulators $7_1$, —, $7_i$, — and $7_8$ in the cumulation circuit 6 are activated by the respective trigger signals $T_1$, —, $T_i$, — and $T_8$. For example, when the step value generation circuit 4 generates the voltage $L_1$, the trigger signal $T_i$ is applied to the cumulation circuit 6, and the accumulator $7_1$ performs cumulative calculation. In a similar manner, when the step value generation circuit 4 generates the voltage $L_i$, the trigger signal $T_i$ is output, and the accumulator $7_i$ performs cumulative calculation.

When the luminance signal DL of a level $DL_i$ is inputted, in the range in which the voltage $L_i$ is lower than the level $DL_i$, the output of the comparator 5 is "0" as shown in the relation (1). Consequently, no numeral data are accumulated in the accumulators $7_1$, —, $7_i$. When the voltage $L_i$ increases and is the level $DL_i$ or more, the output of the comparator 5 becomes "1" as shown by the relation (2). And thus, the comparator 5 outputs "1" at every voltages $L_i$, —, $L_8$ which are higher than the level $DL_i$. The output "1" of the comparator 5 is applied to the respective accumulators $7_i$, —, $7_8$ corresponding to the voltage $L_i$ which are higher than the level $DL_i$ and are accumulated in synchronism with the respective trigger signals $T_i$. The above-mentioned operation is elucidated by using an example hereafter.

When the level of the input luminance signal DL is "70", the output of the comparator 5 is "0" as shown by relation (1), because the voltages $L_1$ (16), $L_2$ (32), $L_3$ (48) and $L_4$ (64) are lower than the level "70". Consequently, no data are accumulated in the accumulators $7_1$, $7_2$, $7_3$ and $7_4$. On the other hand, since the voltages $L_5$ (80), $L_6$ (96), $L_7$ (112) and $L_8$ (128) are higher than the level "70", the output of the comparator 5 is "1" at every voltages $L_5$, $L_6$, $L_7$ and $L_8$. The outputs "1" output at every voltages $L_5$, —, $L_8$ are accumulated in the respective accumulators $7_5$, —, $7_8$.

In a similar manner as mentioned above, the luminance signal DL is classified with respect to entire pixels during one vertical scanning period and is accumulated in the cumulation circuit 6. And thereby the luminance distribution in a video image can be found. Accumulated values in the accumulators $7_1$, —, $7_8$ are stored in the respective memories $8_1$, —, $8_8$, respectively. The data stored in the memory $8_1$, —, $8_8$ are represented by a cumulative histogram shown in FIG. 2.

Figure 2:
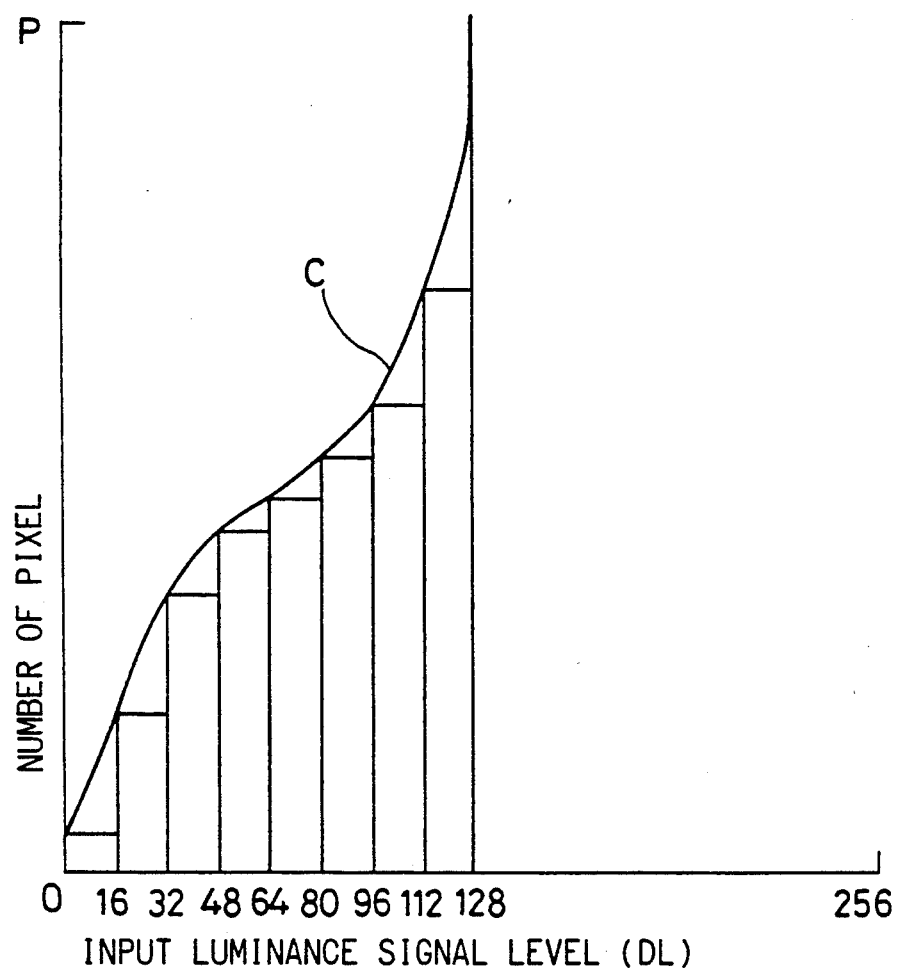
FIG. 2 is a cumulative histogram representing relation between a level of an input luminance signal and the number of pixel in a video image during one vertical scanning period.

Referring to FIG. 2, abscissa designates the level of the input luminance signal DL, and ordinate designates the number of pixel. According to the cumulative histogram, the level which is higher than the level 128 of the input luminance signal DL is not operated in the histogram generation circuit 3. Therefore the cumulative histogram is not produced between the level 128 and the level 256.

In the embodiment, if the range of the levels of the step values of the step value generation circuit 4 is set between a first level $L_a$ and a second level $L_b$, the number of occurrence of the levels in the input luminance signal DL between the first level $L_a$ and the second level $L_b$ is cumulated in the cumulation circuit 6. Consequently, the luminance signal DL which is lower than the first level $L_a$ and is higher than the second level $L_b$ is not cumulated in the cumulation circuit 6. Namely, the range of levels of the luminance signal DL which contributes to produce the cumulative histogram is restricted by selection of the range of the step values which is generated by the step value generation circuit 4.

The output of the histogram generation circuit 3 is applied to an interpolation circuit 7 which is familiar to one skilled in the art, and the data of a "histogram value" is produced. The histogram value is represented by a histogram curve C which outlines the histogram in FIG. 2. The same histogram value is shown by a diagram in FIG. 3(a). The data of the histogram value is applied to a normalization circuit 10.

Figure 3A:
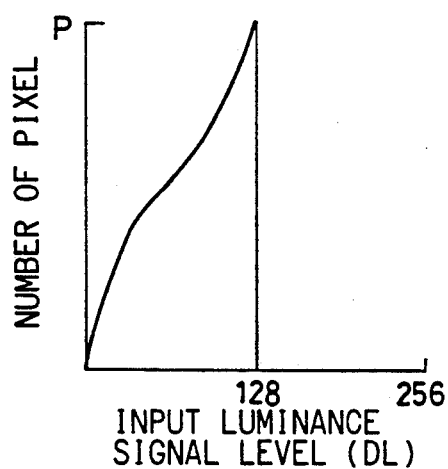
FIGS. 3(a), 3(b), 3(c), 3(d) and 3(e) are diagrams showing operation of the embodiment.
Figure 3B:
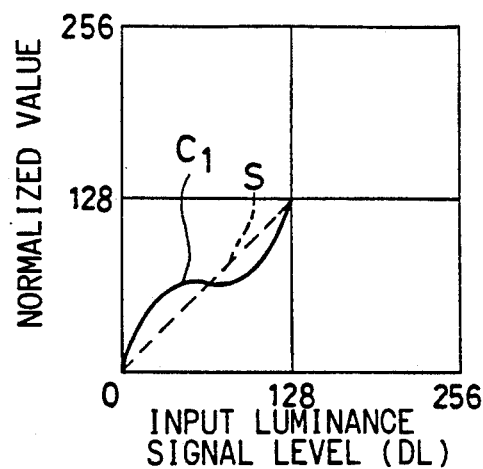

In the normalization circuit 10, the number P of pixel on the ordinate in FIG. 3(a) is changed to a predetermined value. The predetermined value is set to the maximum level 256 of the luminance signal DL, for example. For this operation, a normalization coefficient N ($N<1$) is predetermined so that the length of the ordinate representing the number P of the pixel is equal to the length on the abscissa representing the maximum level 256 of the input luminance signal DL. The normalization coefficient N is multiplied to the number P of pixel in the normalization circuit 10, and the length of the ordinate is converted as shown in FIG. 3(b). The converted value on the ordinate is defined to "normalized value" and the operation in the normalization circuit 10 is called "normalization".

In FIG. 3(b) representing the relation between the input luminance signal DL and the normalized value, a curve $C_1$ represents the normalized value corresponding to the level of the input luminance signal DL. Dotted line S connecting origin "0" and an intersection R of the level 128 of the input luminance signal DL and the normalized value 128 represents a "reference histogram value". Dotted line S represents the relation of a direct proportion between the luminance signal DL and the normalized value.

Figure 3C:
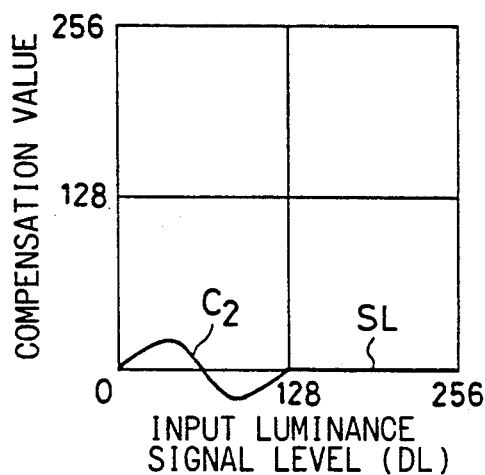

The data of normalized value output from the normalization circuit 10 is applied to adjustment circuit 11. In the adjustment circuit 11, the reference histogram value corresponding to a level of the input luminance signal DL is subtracted from the normalized value corresponding to the level of the input luminance signal DL. Consequently, the curve $C_1$ is shifted on the abscissa as shown by a curve $C_2$ in FIG. 3(c). In FIG. 3(c), ordinate designates a "compensation value". The unit of the compensation value is identical with the normalization value.

Subsequently, the output of the adjustment circuit 11 is applied to an input terminal of an AND gate 14. The other input terminal of the AND gate 14 receives an output of a second digital comparator 12. The input luminance signal DL and a reference value of a reference value generation circuit 13 are applied to the digital comparator 12, and the input luminance signal DL is compared with the reference value. The reference value is set to the maximum level which is generated by the step value generation circuit 4. The reference value is equal to the level 128 in the embodiment, for example.

The level of the input luminance signal DL is equal to the reference value and below, the output of the digital comparator 12 is "1". On the contrary, when the level of the input luminance signal DL is higher than the reference value, the output of the digital comparator 12 is "0". Consequently, the output of the AND gate 14 is identical with the output of the adjustment circuit 11, when the level of the input luminance signal DL is the reference value (level 128) and below. On the contrary, when the input luminance signal DL is higher than the reference value, the output of the AND gate 14 is "0". By the operation of the digital comparator 12, data of zero level which is represented by a straight line SL is generated between the levels 128 and 256.

The output of the AND gate 14 is applied to a multiplier 15 and is multiplied by a coefficient K, which is applied from a "level change data setting circuit". Thereby the level inputted from the AND gate 14 is changed to produce a "compensation value". An example of the compensation value is shown by a curve $C_3$ in FIG. 3(d). The compensation value is a base data for compensating the input luminance signal, and the coefficient K is selected so as to be obtained a desired compensation value. In the example shown in FIG. 3(d), the level of the compensation value is slightly reduced.

Figure 3D:
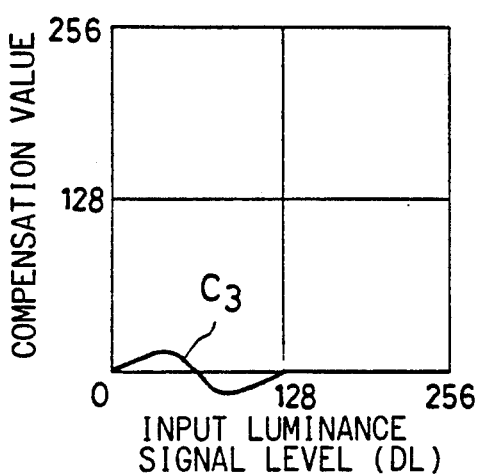

Subsequently, in order to obtain a compensated input luminance signal (hereinafter in referred to as "output luminance signal E") on the basis of the compensation value shown in FIG. 3(d), the compensation value is added to the input luminance signal DL by an adder 17. Consequently, the output luminance signal E is output from the adder 17 as shown by a curve $C_4$ in FIG. 3(e).

Figure 3E:
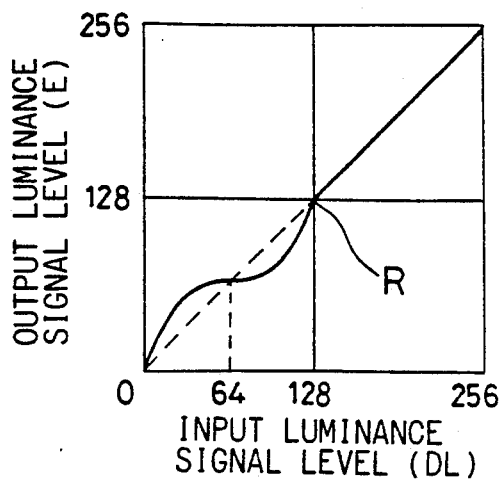

The output luminance signal E is converted to an analog luminance signal by a D/A converter 18, and is output to the terminal 19. The output luminance signal E is compensated with respect to the input luminance signal DL by the compensation value which is shown by a curve $C_3$ in FIG. 3(d). The output luminance signal E shown in FIG. 3(e) is compensated so as to increase when the signal E is in the range of the levels 0, —, 64 of the input luminance signal DL, and is compensated so as to decrease when the signal E is in the range of the levels 64, —, 128. The input luminance signal DL in the range of the levels 128, —, 256 is not compensated.

As is found by the cumulative histogram in FIG. 2, an occurrence frequency of pixel is relatively higher in the range of the levels 0, —, 64 of the input luminance signal DL. Consequently, the output luminance signal E is enhanced with respect to the input luminance signal DL in the range, and the luminance of the image is increased. A density variation in the image is made gentle (i.e. of soft gradation), and contrast decreases.

On the other hand, the occurrence frequency of pixel in the range of the levels 64, —, 96 is relatively lower, consequently, the output luminance signal E is reduced with respect to the input luminance signal DL in the same range, and thereby the luminance is decreased. A variation of luminance in the image is made steep (i.e. of hard gradation), and the contrast increases.

Figure 4A:
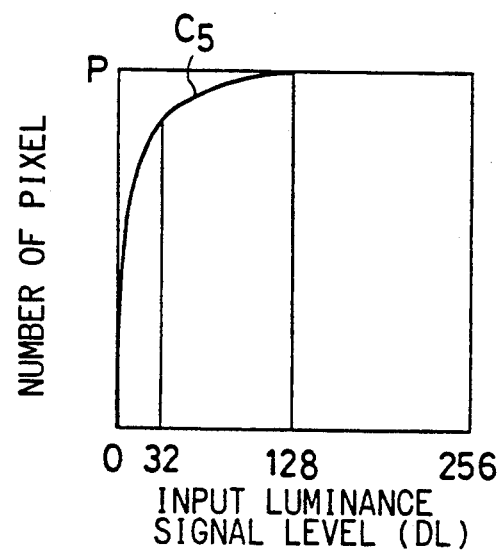
FIGS. 4(a) and 4(b) are diagrams showing a histogram curve with respect to a luminance distribution and a characteristic curve between an input luminance signal and an output luminance signal in a first example of a video image, respectively.
Figure 4B:
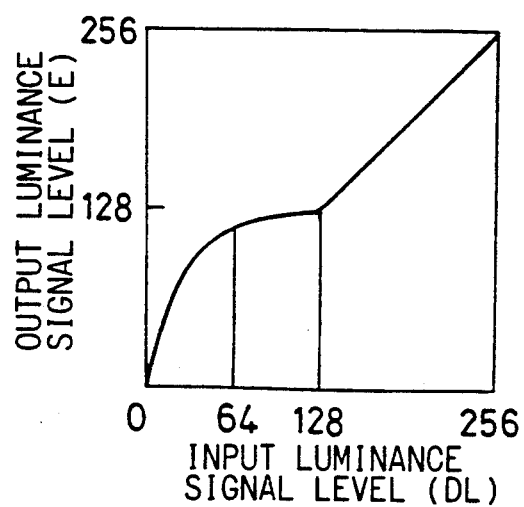
Figure 5A:
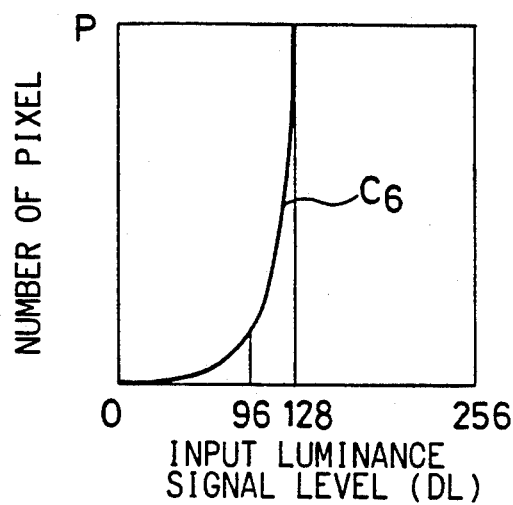
FIGS. 5(a) and 5(b) are diagrams showing a histogram curve with respect to a luminance distribution and a characteristic curve between an input luminance signal and an output luminance signal in a second example of the video image, respectively.
Figure 5B:
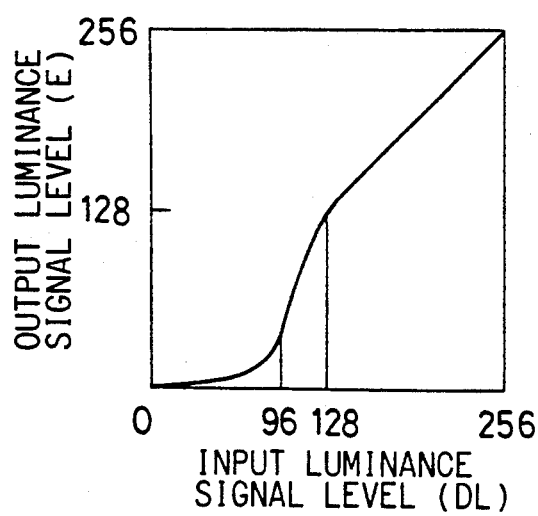

In an attempt to make understanding of the compensation of gradation easy, a first example is shown in FIGS. 4(a) and 4(b), and a second example is shown in FIGS. 5(a) and 5(b).

FIG. 4(a) shows a histogram curve C<sub>5</sub> representing an outline of a cumulative histogram (not shown) in the first example. According to the histogram curve C<sub>5</sub>, an occurrence frequency of pixel with respect to luminance is relatively higher in the range of the levels 0, —, 32 of a low density in the input luminance signal DL, and the frequency occurrence of pixel is relatively lower in higher density. Consequently, a relatively dark image is displayed. Relation between the input luminance signal DL and the output luminance signal E shown in FIG. 4(b) is obtained by applying the process of the present embodiment to the histogram curve C<sub>5</sub>.

In FIG. 4(b), the output luminance signal E is significantly enhanced with respect to the input luminance signal DL in the range of the levels 0, —, 64, and is slightly enhanced in the range of the levels 64, —, 128. By the compensation, the luminance of the pixels in the range of low luminance is increased, and the variation of luminance is significantly increased. Consequently, the contrast increases. On the other hand, the luminance of the pixels in the range of high luminance is slightly increased, and the variation of the luminance is made slightly gentle. As a result, the image is brightened in the entire display, and the contrast increases.

FIG. 5(a) shows a histogram curve C<sub>6</sub> representing an outline of a cumulative histogram (not shown) in the second example. According to the histogram curve C<sub>6</sub>, the occurrence frequency of pixels with respect to luminance is relatively lower in the range of the levels 0, —, 96 of the input luminance signal DL. On the other hand, the occurrence frequency of pixel with respect to luminance is relatively higher in the range of the levels 96, —, 128. Consequently, a whity image is displayed. Relation between the input luminance signal DL and the output luminance signal E shown in FIG. 5(b) is obtained from the histogram curve C<sub>6</sub>.

In FIG. 5(b), the output luminance signal E is significantly reduced in the range of the levels 0, —, 96 of the input luminance signal DL, and thereby the luminance is decreased. On the other hand, the output luminance signal E is slightly reduced in the range of the levels 112, —, 128, thereby the luminance in the display is reduced. Consequently, the occurrence frequency of pixel in the low luminance is increased, and the contrast increases in the entire display. The luminance distribution in the entire display is normalized, and the image having a suitable gradation is reproduced.

In the above-mentioned example, the analog input luminance signal is converted to the digital input luminance signal DL by the A/D converter 2, and the input luminance signal DL is compared with the digital voltages L<sub>1</sub>, —, L<sub>8</sub> by the digital comparator 5. Analog voltages L<sub>1</sub>, —, L<sub>8</sub> are generated by the step value generation circuit 4, and the analog input luminance signal can be compared with the analog voltages L<sub>1</sub>, —, L<sub>8</sub>. In the above-mentioned case, an analog comparator is used as a replacement for the digital comparator 5 of the foregoing examples, and the circuit configuration is simplified because the A/D converter 2 is not used.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A gradation compensation apparatus comprising:
    step value generation means for generating a predetermined number of step value signals which change stepwise in level in the range of a first level and a second level during a predetermined time period,
    first comparator means for outputting a first value when the level of a said step value signal is lower than the level of an input luminance signal, and outputting a second value signal when the level of a said step value signal is higher than the level of said input luminance signal, by comparing said input luminance signal with said step value signals,
    cumulation means comprising a predetermined number of accumulators corresponding to the respective levels of said predetermined number of step value signals, for cumulating said second value output from said comparator means in said accumulators corresponding to the respective levels of said step value signals,
    normalization means for outputting a normalized value by multiplying the cumulated values cumulated by said cumulation means basing on a first coefficient,
    an adjustment circuit for subtracting a predetermined reference histogram value being proportional to the level of said input luminance signal from said normalized value,
    reference value generation means for generating a reference value which is equal to said second level of said step value generation means,
    second comparator means for outputting the signal of a third value when said input luminance signal is equal to said reference value or below, and outputting the signal of a fourth value when said input luminance signal is higher than said reference value, by comparing said input luminance signal with said reference value,
    gate means for outputting the signal of said normalized value of said adjustment circuit when the second comparator means outputs said third value, and outputting the signal of 0 (zero) when said second comparator means outputs said fourth value, by inputting said normalized value output from said adjustment circuit and the output of said second comparator means,
    multiplier means for multiplying the output of said gate means basing on a predetermined second coefficient, and
    addition means for adding said input luminance signal to the output of said multiplier means.

2. A gradation compensation apparatus in accordance with claim 1 further comprising:
    an analog-to-digital converter for converting said input luminance signal to a digital input luminance signal,
    said step value generating means is a digital step value generation means for generating digital step value signals which change step-wise in level in the range of a first level and a second level during a predetermined time period, and
    said first comparator means is a digital comparator means for comparing said digital input luminance signal with said digital step value signal.

3. A gradation compensation apparatus in accordance with claim 1, wherein
    said predetermined time period for changing said step value signals from said first level to said second level is equal to a time length of one pixel of said input luminance signal.

* * * * *